United States Patent [19]
Dunford et al.

[11] Patent Number: 5,476,191
[45] Date of Patent: Dec. 19, 1995

[54] PACKAGE DISPENSING APPARATUS

[75] Inventors: Wyman G. Dunford, Camarillo, Calif.;
James D. Barrett, Redford, Mich.;
Miguel A. Abaunza, Moorpark, Calif.;
Michael J. Kendra, Livonia, Mich.

[73] Assignee: Technicolor Videocassette of Michigan, Inc., Livonia, Mich.

[21] Appl. No.: 264,513

[22] Filed: Jun. 23, 1994

[51] Int. Cl.$^6$ ...................................................... A01C 9/00
[52] U.S. Cl. ......................... 221/218; 221/253; 414/797.6
[58] Field of Search ........................................ 221/218, 253, 221/211; 414/797.6, 797.9; 271/23, 90, 97, 35

[56] References Cited

U.S. PATENT DOCUMENTS

| | | | |
|---|---|---|---|
| 4,805,376 | 2/1989 | Oberdorf | 53/151 |
| 4,949,892 | 8/1990 | Neely et al. | 221/253 |
| 4,955,506 | 9/1990 | Schweiberer | 221/218 |
| 5,064,341 | 11/1991 | Pippin | 414/797.6 |
| 5,271,703 | 12/1993 | Lindqvist et al. | 414/268 |

FOREIGN PATENT DOCUMENTS 4101615  7/1992  Germany.

*Primary Examiner*—Kenneth Noland
*Attorney, Agent, or Firm*—Reising, Ethington, Barnard & Perry

[57] ABSTRACT

Picking apparatus for picking and dispensing plastic sheet wrapped videocassette packages onto a high speed product gathering conveyor comprises a package dispensing mechanism with a package feed magazine containing a replenishable stack of these packages stacked on a platform of the dispensing mechanism. The dispensing mechanism is controlled by a computer and has a pair of dispensing belts with cogs that engage the package at the bottom of the stack and dispense it at a prescribed time off the platform and onto the conveyor. A set of nozzles with a pressurized air supply is operated to forcibly direct air between adjacent packages in the stack in a sequential manner to reduce adhesion therebetween prior to their dispensing and a bumper operated by a controlled plunger timely bumps the package at the bottom of the stack to help free it from the one immediately above and start it in the dispensing direction. Both the air circulation and the bumper act to reduce the force required of the dispensing cogs to dispense the package onto the conveyor in a timely and assured manner.

18 Claims, 2 Drawing Sheets

PACKAGE DISPENSING APPARATUS

TECHNICAL FIELD

This invention relates to dispensing apparatus and more particularly to that used in automated pickers in a product distribution system.

BACKGROUND OF THE INVENTION

In the more advanced high speed pickers used in warehouse product distribution systems to pick and dispense hard-type packages containing products of many different kinds and in very high volumes of orders and product units, the pickers each have a storage and feed magazine located above a separately motor powered product dispensing mechanism. The packaged products are loaded in a stack in the magazine and the dispensing mechanism is selectively operated to timely pick and dispense the products from the bottom of the stack onto a passing high speed product gathering conveyor. A series of these pickers with different packaged products are located along one or both sides of the conveyor and are controlled by a computer which is inputed with work orders and independently operates the pickers to pick and dispense selected products in selected quantities onto the passing conveyor within a time logic window. The time logic window is variable and is adjusted by the computer to a time period just sufficient to accomplish the required picking tasks so as to minimize the picking time for the various orders. So it is imperative that the dispensing mechanisms be able to consistently perform their required tasks as anyone of them that is not performing in the prescribed manner could disrupt the operation of the entire system and cause shortages in the picking.

Dispensing mechanisms for both hard-type and soft-type packages are available in various forms as disclosed in U.S. Pat. Nos. 4,805,376; 5,064,341 and 5,271,703 and German Offenlegungsschrift DE 41 01 615 A 1. Those believed to produce the best dispensing action for relatively hard-type packages such as contemplated here have one or more chains or belts with cogs that travel linearly in their dispensing action and engage the lower edge of one side of the package at the bottom of the stack and propel it at the proper time off a stack supporting platform onto the passing conveyor. Such a dispensing mechanism with a single cogged chain is disclosed in the above U.S. Pat. No. 5,271,703 (see FIG. 5). In such mechanisms, the cogs have a blunt configuration and provided the adjacent packages in the stack do not tenaciously stick to each other, the swift cog engagement dispensing action that is required does not damage the package and the dispensing occurs in the required timely manner.

Efficient and accurate picker operation is of particular importance in the case of direct distribution systems providing variable client specified price labels where orderly high speed picking and conveyance through the system is required. An example of such a direct product distribution system adapted to process packaged videocassettes is disclosed in U.S. patent application Ser. No. (attorney's docket number P-301) entitled "Product Distribution System" filed concurrently herewith and assigned to the assignee of this invention. In such a system, the pickers are required to dispense the packaged videocassettes onto a high speed product gathering conveyor in an orderly spaced manner so that they may then be efficiently conveyed and processed for price labeling and packing.

In the packaging of videocassettes and other products where it is desired that the identifying box or case containing the product be sealed, it is common practice to cover the product container with a low cost shrink wrapped sheet or film of transparent poly vinyl chloride (PVC). This has been found to present a processing problem in dispensing which is most acute when the case for the product is a so-called "clam shell" that is also made of PVC. Due to heat, humidity, and the adhesive characteristics of PVC, the packages, and particularly those where the package is a vinyl clam shell, have a tendency to stick together with an adhesive strength that increases with increasing temperature and humidity. When this sticking becomes pronounced, it has been found that conventional dispensing mechanisms are no longer able to free the package from its stack quickly enough to effect the programmed spacing on the conveyor. Moreover, these conventional dispensing mechanisms can then damage the package and/or the product and may not even be capable of freeing the product package at all resulting in a jam up in the feed magazine and a shortage in the picking.

For example, the force required of the above mentioned dispensing cogs to overcome the adhesion between the packages can become so great as to cause the cogs to imprint the product package resulting in an item that must be replaced after having been received on the conveyor and processed through the system. In some instances, the resisting force can even be so great as to cause the cogs to impact the package so severely as to break a product such as a plastic videocassette case. Or the cogs may even tear through and across the underside of the package and not actually effecting its dispensing onto the conveyor and leaving the package mangled and possibly jammed in the stack on the dispenser. In an attempt to solve this problem, dry-type lubricants have been suggested for the PVC shrink wrap but they can possibly contaminate the dispensing mechanism and other apparatus in the distribution system. It has also been proposed to change the wrapping material to one that does not have such sticky characteristics but they have thus far been found to be more costly and may not be at the option of the management of the distribution system and with the choice dependent on who is in control of the packaging.

SUMMARY OF THE INVENTION

The present invention provides for continued use of the commonly used low cost PVC shrink wrap material without the attendant dispensing problems and is accomplished with relatively simple, compact, cost effective modifications of the cogged type dispensing mechanisms. As mentioned earlier, such dispensing mechanisms have one or more chains or belts with cogs that engage a lower edge of one side of the package at the bottom of the stack and dispense it at a prescribed time off a platform and onto the conveyor. The present invention adds a pneumatic nozzle arrangement that forcibly directs air between adjacent packages at a fixed position in the stack each time the dispensing mechanism is operated. The forced air enters between the interfaces of these packages and acts to slightly separate or free them from each other and reduce the adhesion therebetween by air circulation past their interfaces prior to the eventual dispensing of the lowermost of these packages by the cogged dispenser. This action significantly reduces the eventual dispensing force required but which can still remain at such a high level as to cause the problems earlier discussed in the more severe sticking situations encountered in a warehouse environment.

To forestall the worst situation, there is also added a plunger device. The plunger device is also operated simultaneously with the cogged dispenser and bumps the package at the bottom of the stack that is being dispensed to help free it from the one immediately above and start it in the dispensing direction to dramatically reduce the force required of the cogged dispenser in timely dispensing the product onto the passing conveyor. For example, in the case of packaged videocassettes with a PVC wrap, it was found that without the present invention the dispensing force required of the cogged dispenser could rise to a damaging high of 90 pounds at the cogs whereas with the present invention this force never exceeds 60 pounds which does not do any damage to the package and its dispensing at the correct time is assured.

Among the several features of the present invention is the freedom allowed in the choice of packaging as the combination of the air injection and the bumper action of the plunger accommodates the worst anticipated sticking situation while not affecting the normal dispenser operation and need be added only to those picker mechanisms required to handle such sticky type packaging. However, it is also contemplated that the invention is applicable to those situations where the dispensing action force becomes excessive in overcoming friction because of the shear weight of the stack with especially heavy packages or products having interfaces that are not of a sticky nature and have a relatively low coefficient of friction and between which air can be readily injected. Another feature is that the air is injected only during a normal dispensing operation to thus conserve the air pressure supply to support a large number of pickers. A further feature is that the air injection is adjustable along the length (height) of the storage and feed magazine to a position best suited to effectively inject the air depending on the particular packages in the stack. For example, where the packages are relatively light, air can be effectively injected at a relatively low point in the stack to temporarily separate adjacent packages for air circulation therebetween. And this low point can be immediately above the plunger device so that the air injection occurs in close time proximity to their eventual dispensing. On the other hand, where the packages are relatively heavy, the air injection is adjusted upwardly to a relatively high point in the stack to compensate for the heavier stacked weight in effecting the air interjection.

Still another feature is that the plunger device need only provide a very short stroke as its function is to bump start the package being dispensed rather than being required to fully compliment the dispensing stroke of the cogs. Another feature is that the bumper contacts the package in an area not contacted by the cog(s) so that the unit stress from the reaction force on the package is spread between the bumper and the cog(s) rather than being concentrated just at the latter as in the normal case. So there is less tendency to imprint the package with the cogs at whatever force is required to effect the dispensing.

It is therefore an objection of the present invention to provide a new and improved picker dispensing mechanism.

Another object is to utilize both air injection and a bumper to assist the dispensing of packages by a picker dispensing mechanism.

Another object is to incorporate air injection and a bumper device in a picker dispensing mechanism to forcibly circulate air between PVC wrapped packages being dispensed from a stack to reduce the local temperature and humidity and thereby their stickiness and to also forcibly bump a package at the time of its dispensing to help separate it from the stack for timely dispensing onto a passing conveyor.

Another object is to reduce the force required to dispense a package from a picker mechanism by injecting air between the packages while they are stacked in a storage and feed magazine supplying the dispensing mechanism and by bumping the package being dispensed at the start of the dispensing action to help free it from stack for timely dispensing onto a passing conveyor.

Another object is to employ both air circulation between the packages in a package picker's storage and feed magazine and a bumper in the picker's dispensing mechanism to facilitate the on-time dispensing of the packages onto a passing conveyor.

Another object is to cost effectively modify a package picker's storage and feed magazine and dispensing mechanism to alleviate a sticking problem with certain packages and assure their timely dispensing without damage thereto.

Another object is to assure the timely dispensing by an automated package picker of packages that tend to stick together without damaging the packages by means of both forced air circulation and bumper action.

Another object is to modify an automated package picker to dispense sticky packages in a timely and efficient manner without damage and without the use of lubricants applied to the packages.

Another object is to modify an automated package picker so as to not require a change in the packaging of the products to alleviate a sticking problem.

These and other objects, advantages and features of the present invention will become more apparent from the following detailed description and accompany drawings in which:

DETAILED DESCRIPTION OF THE DRAWINGS

Figure 1:
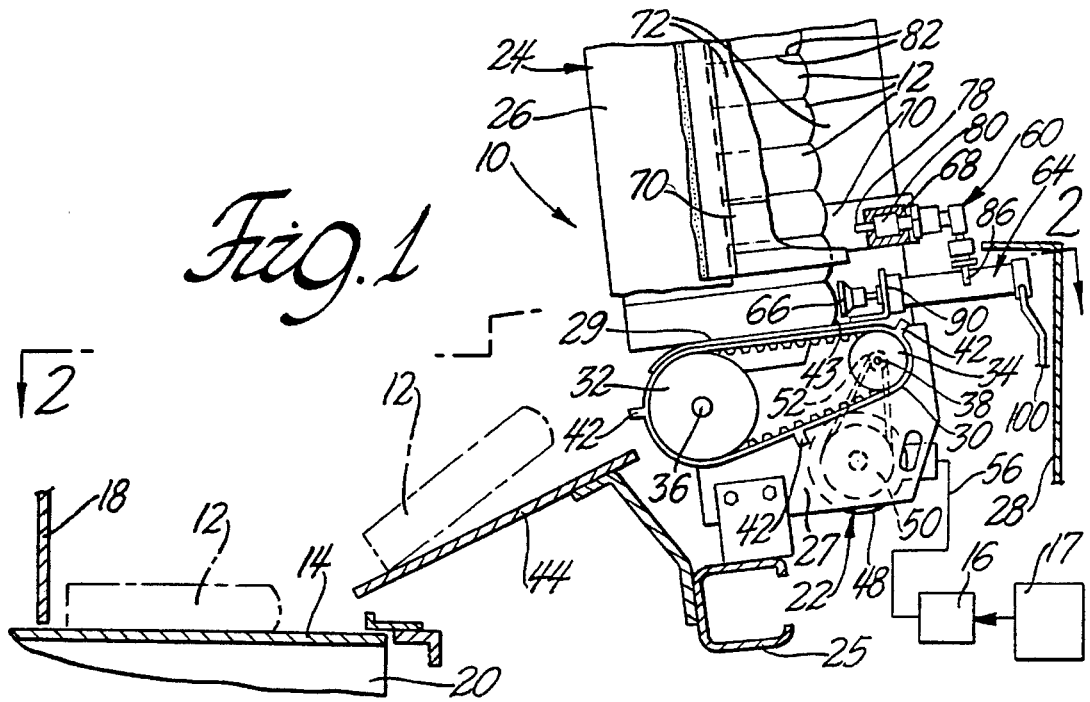
FIG. 1 is a side view of the preferred embodiment of the package picker according to the present invention as installed to dispense packages onto a package gathering conveyor.

Referring to the accompanying drawings, there is illustrated a package picker module 10 for picking and dispensing packages 12 onto a high speed horizontal package gathering conveyor belt 14 in a distribution system like that disclosed in the above mentioned U.S. Patent Application Serial No. (attorney's docket no. P-301) which is hereby incorporated by reference. In such a system, there will be a number of these picker modules located along one or both sides of the conveyor for picking and dispensing different packaged products such as videocassettes with different video tapes. Each of the pickers is supplied with a certain packaged product and a computer 16 scheduled with work orders from a central computer run scheduling station 17 independently operates the pickers to pick and dispense selected ones of the different products in selected quantities and dispense them in spaced relationship with each other onto the passing conveyor. In this particular system, there is provided a partition 18 located immediately above and extending along the center-line of the flat conveyor belt 14 to assure that the items dispensed from opposite sides of the conveyor are located in two orderly spaced rows along the belt. The conveyor belt 14 is mounted on rollers 20 (only one shown) and the belt is driven at a constant high speed of about 360 feet per minute by a motor (not shown) connected to drive one of the rollers.

The picker module 10 generally comprises a dispensing mechanism 22 and a storage and feed magazine 24 mounted on a support structure 25 at one side of the conveyor belt 14. The magazine 24 is located overhead the dispensing mechanism and stores the packages 12 in a stack and feeds them to the dispensing mechanism for dispensing onto the conveyor belt 14 as it quickly passes. The magazine 24 is generally vertically oriented and comprises a C-shaped channel 26 having an open side facing away from the conveyor belt 14 and through which the packages are manually loaded one on top of another in a stack. The magazine channel 26 is oriented with a slight backward angle toward the conveyor belt for the purpose of retaining the stacked packages therein. The packages 12 illustrated contain videocassettes that are packed in a PVC clam shell container that is shrink wrapped with a thin sheet of PVC. As mentioned earlier, these kinds of packages tend to stick together while stacked in the picker magazine with the sticking or adhesive force increasing with increasing temperature and humidity.

Figure 2:
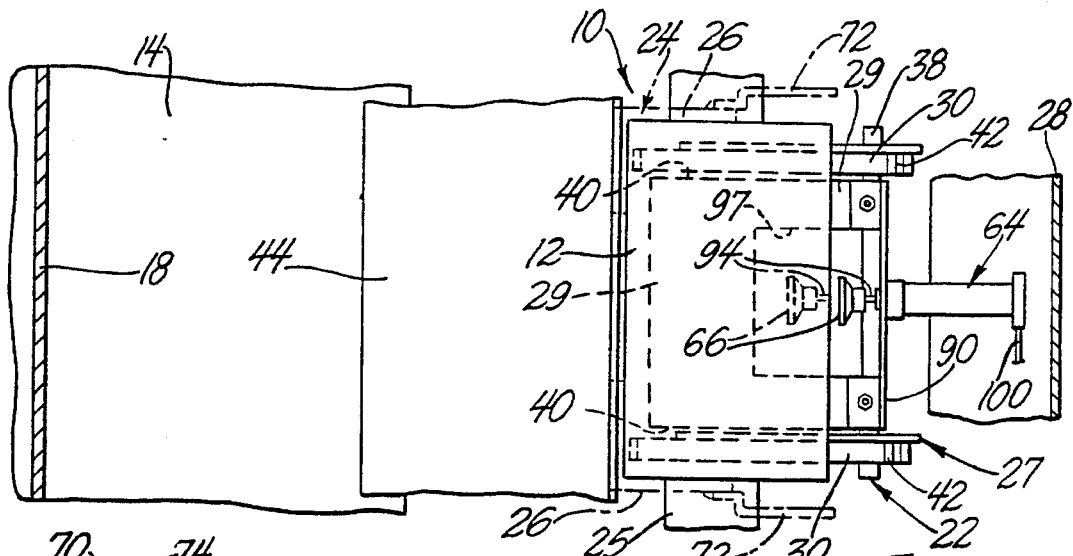
FIG. 2 is view taken along the line 2—2 in FIG. 1.

The dispensing mechanism 22 comprises a frame 27 that is fixed to the support structure 25 behind a cover 28 and has an upper substantially horizontal flat section forming a platform 29 that is located above the elevation of the conveyor belt 14 and on which the packages 12 are stacked one on another in the magazine channel 26. The platform 29 extends parallel to the conveyor belt 14 and is angled slightly downward in the direction of the belt as seen in FIG. 2 to direct the packages downwardly onto the belt. The packages are dispensed one at a time from the platform 29 onto the passing conveyor belt 14 by a pair of rubber cogged belts 30 that extend parallel to each other and at right angles to the conveyor belt and are located adjacent to and along opposite sides of the dispenser frame 27. The belts 30 extend directly beneath the magazine 24 and are each received on a large diameter sprocket 32 and a small diameter sprocket 34. The sprockets 32 and 34 are fixed to the ends of shafts 36 and 38, respectively, that are rotatably supported by parallel vertical side walls 40 of the frame 27 that join at right angles with the platform 29. The shafts 36 and 38 extend parallel to the conveyor belt 14 with the two large sprockets 32 located above and closest thereto and directly under the magazine 24 and the small sprockets 34 located at a slightly higher elevation than the large sprockets and outward of the magazine relative to the conveyor belt.

The belts 30 extend along the outer side of the respective frame side walls 40 and in addition to having inwardly projecting cogs on their inner side that engage the sprockets 32 and 34, also have three, blunt, rectangularly shaped, outwardly projecting package dispensing cogs 42 on their outer side. The dispensing cogs 42 are equally spaced along the length the belts 30 and are recirculated thereby to effect dispensing of the packages. The distance between the dispensing cogs 42 is greater than the width of the packages and the cogs extend above the platform 29 as they travel therealong to engage the lower edge of an outer side 43 of the packages 12 adjacent one end thereof. See FIGS. 1 and 2. The position of the sprockets 32 and 34 locates the outer side of the belts 30 between the cogs 42 a small distance (clearance distance) below the top surface of the platform 29 so that the belts do not rub against the bottom of the package on the platform and permit the latter to lay flat thereon in preparation for engagement by the cogs. The cogs 42 on the two belts 30 are laterally aligned with each other in pairs so as to simultaneously engage the package adjacent the opposite ends thereof and then, on traveling in a linear or straight line direction with their belt from the sprocket 34 to the sprocket 32, dispense the package with a force that propels it off the platform 29 onto an apron 44 that guides it onto the conveyor belt 14 as illustrated in phantom-line in FIG. 2. The apron 44 slants downwardly toward the conveyor belt and is fixed to the support structure 25 between the sprockets 32 of the dispensing mechanism 22 and the conveyor belt 14 to thus provide a bridge between the dispensing mechanism and the conveyor belt. The dispensing belts are preferably cogged rubber belts with three dispensing lugs on each belt as illustrated, but it will be understood that the number of cogs per belt could be more or less depending on the length of the belt and the width of the packages. Moreover, the cogs could also be interconnected by a chain and made of a more rigid material such as a plastic and fiber composite material or metal.

The dispensing mechanism 22 is actuated by a DC stepping motor 48 that is drivingly connected to the pulley shaft 38 by sprockets 50 and 52 and a cogged belt 54 as illustrated in FIG. 1. The motor 48 is connected by a transmission link 56 with the computer 16 and controlled by the latter to effect incremental movement of the dispensing belts 30 in a time logic window for a particular work order with their laterally aligned dispensing cogs 42 then moving in a slightly downwardly slanted plane to effect the quick dispensing of the lowermost package in the magazine stack onto the fast moving conveyor belt 14. This may occur one or more times in the picking time logic window set for a particular work order depending on the number of these packages selected in the work order being processed as scheduled to the computer 16 by the scheduling station 17. It is important that the packages be dispensed at a precise time so that they and those dispensed by other similar pickers at locations along the conveyor belt are deposited onto the latter in a row in spaced relationship wherein a certain minimum space such as several inches is maintained between adjacent picked packages on the conveyor belt.

To insure that this timely dispensing is effected, there is provided both an air injection system 60 and a pneumatically operated plunger device 64 with a bumper 66 that together reduce the force required of the dispenser cogs 42 to actually dispense the packages onto the passing conveyor belt 14. The function of the air injection system 60 is to forcibly direct air between adjacent ones of the packages in the stack to reduce the sticking tendency therebetween prior to their dispensing and the function of the plunger operated bumper 66 is to bump the lowermost package free of the package immediately above at the start of the dispensing of the former by the cogged dispensing belts 30.

The air injection system 60 comprises a manifold 68 that is mounted on the outward side of the magazine with U-shaped clamp arms 70 that are fixed to opposite ends of the manifold. The clamp arms 70 straddle a side extension 72 of the magazine channel 26 and a bolt 74 threaded in the outer one of the arms at each manifold end is forced to engage the respective channel extension to clamp the manifold to the magazine channel. A nut 76 received on each bolt 74 is then tightened against the respective channel extension 72 to lock the this clamping action to firmly secure the manifold in place.

The manifold is located above the dispensing mechanism 22 and extends parallel to the stacked packages in the magazine channel 26. A row of air nozzles 78 are fixed to the manifold to connect with a plenum 80 therein and are positioned by the manifold directly opposite and closely adjacent to the interfaces 82 of two adjacent ones of the packages in the stack. In the illustrated embodiment, the nozzles 78 are directed at the interfaces of the second and third packages above the platform 29 but it will be understood that this could be adjusted upward or downward as will be further explained later.

Figure 3:
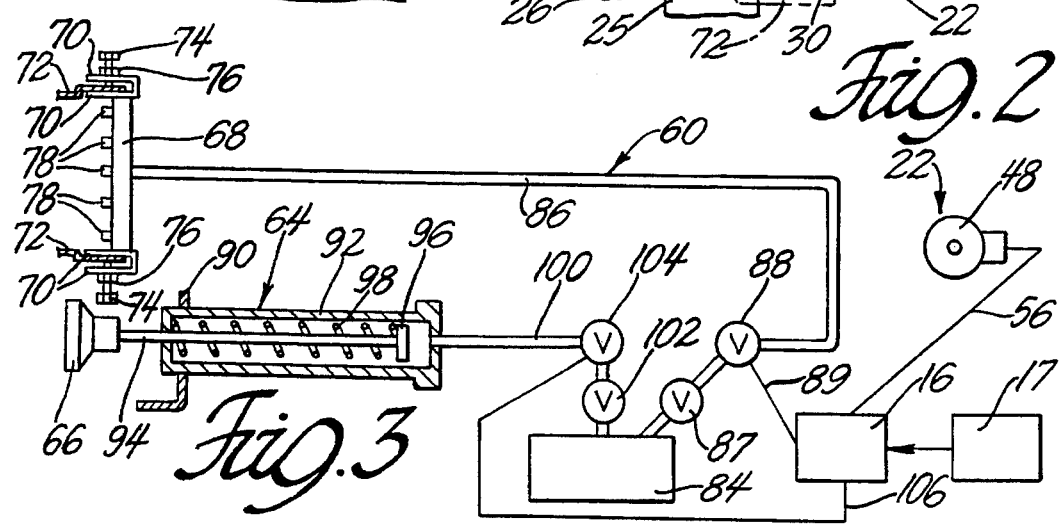
FIG. 3 is a diagrammatic view of the control system for the air injection system and plunger device in FIGS. 1 and 2.
Figure 4:
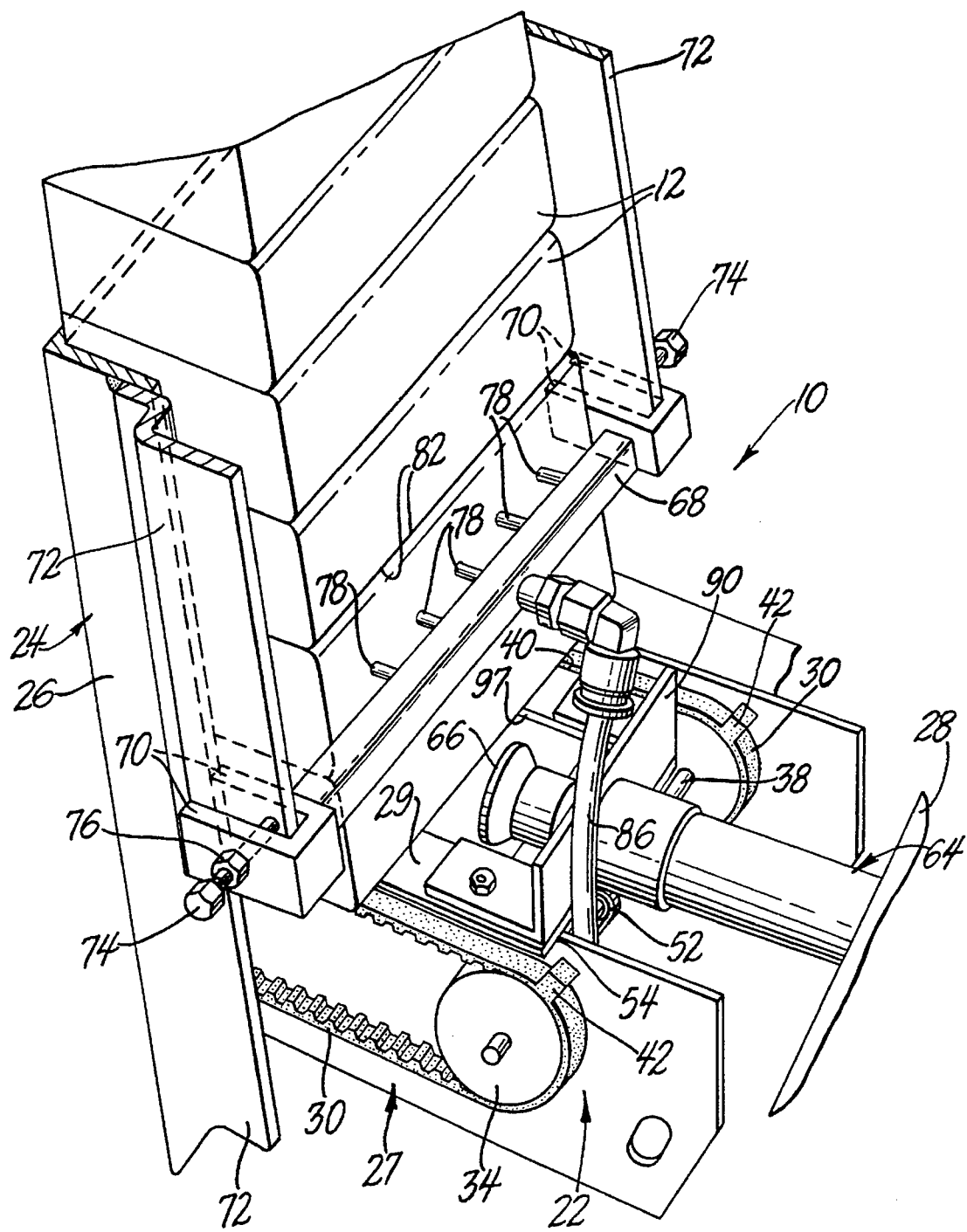
FIG. 4 is an enlarged perspective view of the package picker in FIGS. 1 and 2.

The manifold plenum 80 is connected to a pressurized air supply 84 of dehumidified and cooled air by a hose 86, a pressure regulator valve 87 and a solenoid operated on-off valve 88 that is connected by a transmission link 89 with the picking computer 16. See FIG. 3. Each time the computer 16 operates the dispensing mechanism 22, it is also adapted to effect opening of the valve 88 at the start of the dispensing cycle and then closure of the valve at the end thereof so that the air is injected co-extensively with each package dispensing operation.

On opening the valve 88, the nozzles 78 then deliver high pressure streams of air to the interfaces 82 of the packages then located directly there across as the lowermost package in the stack is being dispensed and as the packages with these interfaces eventually start to fall as a result of the removal of the dispensed package from beneath the stack. The interfaces 82 of the packages 12 are not in perfectly flat sealing contact because of the nature of the packaging and the high pressure air streams from the nozzles 78 are allowed by this characteristic to enter to some degree between the interfaces both before as well as during the free fall and without having to lift the weight of the stack above. On the other hand, the free fall action temporarily relieves the force holding these interfaces together and the air streams from the nozzles are then readily allowed to enter there between to force their slight separation and by the accompanying increased air circulation therepast contribute significantly to reducing the local humidity and their surface temperature. As to the magnitude of the high pressure streams used in the illustrated embodiment, it was found a pressure of about 60–80 psi in the plenum 80 gave excellent results over a wide range of ambient conditions.

The weight of the packages above the interfaces where the air is injected by the nozzles 78 presses these interfaces together prior to the free fall and thus directly affects the amount of air pressure required to effect circulation at that time. The location of the nozzles and/or the air pressure is adjustable to produce significant air circulation between the packages at the start of the dispensing as well as during the free fall. For example, the air pressure can be adjusted with the regulator valve 87 and/or the position of the nozzles 78 can be adjusted upwardly or downwardly with the bolts 74 to the point where significant air circulation starts immediately between the interfaces of the packages at or just before the start of the dispensing action and then continues during the free fall to reduce the sticking sufficiently to allow a later and thus eased bump start by the plunger device 64. Preferably, the manifold 68 is located as low as possible in the stack so that the time of air circulation occurs as close as possible to the time when they are ultimately dispensed.

The air thus caused to circulate between these packages temporarily frees them of each other and reduces the temperature of their shrink wrap and the local humidity and thereby reduces their tendency to stick together when ultimately being dispensed. By operating the forced air injection or circulation only when a dispensing action is commanded, the air pressure supply is only periodically used and then to direct air only once between adjacent packages as they approach the dispensing platform thus conserving the air supply in a highly efficient manner.

The plunger device 64 is mounted with a bracket 90 on the dispenser mechanism frame 27 in a location centrally between the dispensing belts 30. The plunger device comprises a cylinder 92 to which the bracket 90 is fixed at one end and in which a plunger 94 with a piston 96 is mounted for reciprocal movement. The plunger 94 is located by the mounting of the cylinder 92 for movement parallel to the platform 29 and in a direction at right angles to the packages and directly opposite the middle of the package then on the platform. The bumper 66 is connected to the outer end of the plunger 94 and is normally biased to a retracted position clear of the stack of packages by a spring 98 that is mounted in the cylinder and acts on the piston. The piston is forcible by air pressure acting thereon to compress the spring and move the bumper 66 to a fully extended position as shown in phantom-line where it bumps the package then on the platform at a mid-portion thereof while clearing the package immediately above and moves the formed in the dispensing direction but through a distance substantially less than the linear dispensing movement or stroke of the dispensing cogs 42. For example, the linear dispensing movement of the cogs 42 will travel more than the span of the package in dispensing same while the bumping stroke is only a fraction thereof such as one-fourth the span of the package or less as its action is to free the package and let the cogs 42 effect the timely dispensing of the package onto the passing conveyor belt 14.

The plunger device 64 is connected to the pressurized air supply 84 by a hose 100, a pressure regulator valve 102 and a solenoid operated on-off valve 104 that is connected by a transmission link 106 with the picking computer 16. See FIG. 3. Each time the computer 16 operates the dispensing mechanism 22, it is also adapted to effect rapid opening and closing of the valve 104 at the start of the dispensing operation with the cogs 42 so that the bumper 66 then bumps the package being dispensed in the direction of the conveyor belt 14 to free it from the package immediately above and then retracts to get out of the way of this then overhanging package which falls onto the platform as soon as the cogs 42 clear the package being dispensed there from. The bumper 66 is made of rubber or some other suitable relatively soft flexible material so that it provides a cushioned bumping action as contrasted with the blunt un-cushioned engagement of the dispensing cogs 42.

The bumping force is adjustable with the regulator valve 102 and is determined so that just sufficient bumping force is provided to free the package and leave the dispensing cogs 42 to perform the actual dispensing of the package onto the passing conveyor belt 14. For example, without the above prior performed forced air injection and circulation and the above bumping action according to the present invention, the force required of the cogs 42 to dispense the package could reach a damaging high of 90 pounds with these particular packages. With the present invention, this force is maintained below a non-damaging force of 60 pounds and with the force required of the bumping action just a small fraction of the former because of the reduction in adhesion by the air injection. Moreover, the bumping force is applied to an area on the package (i.e. its mid-portion) different than the areas contacted by the cogs 42 (i.e. end portions of the package) so that these forces are distributed or spread over a wide area to thereby minimize the local unit stresses incurred by the package in effecting its dispensing from the stack and onto the conveyor belt 14. Furthermore, it will be understood that the configuration of the bumper and/or the lugs can be expanded laterally relative to the package to further reduce the associated unit stress on the packages.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may by made. It is therefore to be understood that within the scope of the appended claims, the invention may be practiced otherwise than as specifically shown and described.

What is claimed is:

1. Apparatus for dispensing packages onto a passing conveyor comprising a package dispensing mechanism, a package storage and feed magazine adapted to locate a stack of said packages on said dispensing mechanisms said package dispensing mechanism having at least one pair of recirculating cogs adapted to simultaneously engage the lowermost package in the stack at laterally spaced locations and dispense same onto the passing conveyors a pressurized air injection system adapted to forcibly inject air between adjacent ones of the packages in said stack to reduce adhesion therebetween prior to their being dispensed, and a plunger device adapted to bump the package being dispensed toward the passing conveyor to free same from said stack for dispensing by said cogs onto the passing conveyor.

2. Apparatus as defined in claim 1 wherein said pressurized air injection system comprises a row of air nozzles located at a prescribed location in said stack so as to be directly opposite the interfaces of adjacent ones of the packages as they are fed to said dispensing mechanism.

3. Apparatus as defined in claim 1 wherein said dispensing mechanism comprises a pair of cogged belts that dispense the packages with a linearly directed motion, and said plunger device comprises a bumper that is adapted to bump the packages with a linear directed motion and then immediately retract out of the way of said stack.

4. Apparatus as defined in claim 1 wherein said plunger device comprises a bumper that is normally biased to a retracted position out of the way of said stack and is activated to bump the package being dispensed simultaneously with the engagement of said cogs.

5. Apparatus as defined in claim 1 wherein said dispensing mechanism is capable of providing a dispensing force at said cogs that could cause damage to the packages, and said pressurized air injection system and said plunger device are adapted to co-operatively reduce the dispensing force required of said cogs to a value that can not damage the package.

6. Apparatus as defined in claim 1 wherein said dispensing mechanism comprises a platform adapted to support said stack and a pair of cogged belts adapted to engage the lowermost package while supported on said platform and effect its dispensing onto the conveyor, said pressurized air injection system comprising a plurality of air nozzles adapted to direct air streams directly at the interfaces of adjacent ones of the packages at a prescribed location in said stack simultaneously with the operation of said dispensing mechanism.

7. Apparatus as defined in claim 6 wherein said plunger device comprises a pneumatically operated plunger with a bumper arranged between said cogged belts to engage a mid-portion of the package on said platform.

8. A method of dispensing packages onto a passing conveyor comprising the steps of:

arranging a plurality of said packages in a stack adjacent to and at one side of the passing conveyor, forcibly injecting air between the packages in said stack to reduce the adhesion therebetween, bumping the lowermost package in said stack toward the passing conveyor with one force to free same from said stack, and dispensing the bumped package onto the passing conveyor with a separate combination of forces acting at different locations on the bumped package.

9. A method as defined in claim 8 further comprising the step of forcibly directing the air in a plurality of air streams between the interfaces of adjacent ones of the packages at a prescribed location in said stack and while these packages are falling downward toward said dispensing mechanism as the result of the lowermost package just having been dispensed.

10. A method as defined in claim 8 further comprising the steps of bumping the lowermost package with a linearly directed force on a mid-portion of the package, and dispensing the lowermost package with linearly directed forces on end portions of the package.

11. A method as defined in claim 8 further comprising the step of periodically directing the air between adjacent ones of the packages in said stack.

12. A method as defined in claim 8 further comprising the steps of providing a dispensing force capable of causing damage to the packages in attempting to dispense same onto the passing conveyor, and using the directed air and bumping action in a co-operative manner to reduce the dispensing force to a value that will not damage the packages.

13. A method as defined in claim 8 further comprising the step of bumping the lowermost package simultaneously with the dispensing of same onto the passing conveyor.

14. A method as defined in claim 8 further comprising the step of bumping the lowermost package at the start of the dispensing of same onto the passing conveyor.

15. A method as defined in claim 8 further comprising the step of forcibly directing the air between the interfaces of adjacent ones of packages at a prescribed location in said stack and only during the dispensing of the lowermost package onto the passing conveyor.

16. A method as defined in claim 8 further comprising the step of cooling and dehumidifying the air directed at the packages.

17. Apparatus for dispensing packages with a PVC wrap onto a passing conveyor comprising a package dispensing mechanism, a package storage and feed magazine adapted to locate a stack of said packages on said dispensing mechanism, said package dispensing mechanism having at least one pair of recirculating cogs adapted to simultaneously engage the lowermost package in the stack at laterally spaced locations and dispense same onto the passing conveyor, a pressurized air injection system adapted to forcibly inject air between adjacent ones of the packages in said stack to reduce the adhesion therebetween of their PVC wraps prior to their being dispensed, and a plunger device adapted to bump the package being dispensed toward the passing conveyor to free same from said stack for dispensing by said cogs onto the passing conveyor.

18. A method of dispensing packages with a PVC wrap onto a passing conveyor comprising the steps of:

arranging a plurality of said packages in a stack adjacent to and at one side of the passing conveyor, forcibly injecting air between the packages in said stack to reduce the adhesion therebetween of their PVC wraps, bumping the lowermost package in said stack toward the passing conveyor with one force to free same from said stack, and dispensing the bumped package onto the passing conveyor with a separate combination of forces acting at different locations on the bumped package.

* * * * *